United States Patent
Mills (10) Patent No.: US 10,047,783 B2
(45) Date of Patent: Aug. 14, 2018

(54) FLEX REDUCTION CLIP NUT

(71) Applicant: The Boeing Company, Chicago, IL (US)

(72) Inventor: Christopher J. Mills, Charleston, SC (US)

(73) Assignee: The Boeing Company, Chicago, IL (US)

( * ) Notice: Subject to any disclaimer, the term of this patent is extended or adjusted under 35 U.S.C. 154(b) by 58 days.

(21) Appl. No.: 15/194,267

(22) Filed: Jun. 27, 2016

(65) Prior Publication Data

US 2017/0370395 A1 Dec. 28, 2017

(51) Int. Cl.
*F16B 37/04* (2006.01)
*F16B 5/06* (2006.01)

(52) U.S. Cl.
CPC .......... *F16B 37/044* (2013.01); *F16B 5/0635* (2013.01)

(58) Field of Classification Search
CPC ..... F16B 37/043; F16B 37/044; F16B 37/041
USPC ................. 411/174, 175, 112, 970
See application file for complete search history.

(56) References Cited

U.S. PATENT DOCUMENTS

| 2,159,573 | A | | 5/1939 | Tinnerman | |
|---|---|---|---|---|---|
| 2,252,904 | A | * | 8/1941 | Todd | F16B 37/041 411/175 |
| 2,552,499 | A | * | 5/1951 | Tinnerman | F16B 37/044 411/112 |
| 3,145,753 | A | | 8/1964 | Kreider | |
| 3,229,743 | A | * | 1/1966 | Derby | F16B 37/041 411/175 |
| 3,999,583 | A | * | 12/1976 | Nelson | F16B 37/041 411/182 |
| 4,074,491 | A | * | 2/1978 | Bell | B64C 1/06 411/116 |
| 4,286,642 | A | * | 9/1981 | Keatley | F16F 1/36 29/453 |
| 4,676,706 | A | * | 6/1987 | Inaba | F16B 37/041 411/175 |
| 4,897,005 | A | | 1/1990 | Peterson et al. | |
| 5,339,500 | A | * | 8/1994 | Muller | F16B 37/041 24/514 |
| 5,707,192 | A | * | 1/1998 | Vortriede | F16B 37/041 411/175 |
| 5,890,858 | A | | 4/1999 | Leroux | |
| 7,465,135 | B2 | * | 12/2008 | Fritsch | F16B 37/043 411/112 |
| 8,177,466 | B2 | * | 5/2012 | Csik | F16B 37/043 411/174 |
| 9,156,414 | B2 | | 10/2015 | Diez Herrera | |
| 9,267,529 | B2 | | 2/2016 | Tejero Salinero | |
| 2011/0311331 | A1 | | 12/2011 | Tejero Salinero | |

\* cited by examiner

*Primary Examiner* — Flemming Saether
(74) *Attorney, Agent, or Firm* — Kolisch Hartwell, P.C.

(57) ABSTRACT

A spring fastener clip includes first, second, and third strips, each with a corresponding hole therethrough. The clip is bent to form an S-shape, wherein the first strip, the second strip, and the third strip are aligned one with another, and the three holes are aligned one with another. The spring fastener clip further includes a hook extending from the second strip to the first strip and including a tab proximate the first hole. When a substrate is disposed between the first and second strips, the tab hooks over an edge of the substrate and resists flexing of the clip on installation of a fastener.

18 Claims, 4 Drawing Sheets

FLEX REDUCTION CLIP NUT

FIELD

This disclosure relates to fastener assemblies. More specifically, various disclosed embodiments relate to clip nuts and clip nut fastener assemblies.

BACKGROUND

Clip nuts clip around a substrate such as a metal flange, and are designed to clip a nut with threads into place before installing a screw or other fastener through the threads. The clip portion of the clip nut is often made of spring steel, which is inherently flexible so that the clip may slide over an underlying substrate, and into a desired installed location. The flexibility of the spring steel can be problematic, however. For example, in prior art clip nuts, when installing a fastener (e.g., a threaded screw or bolt that goes through the threads of the nut) and simultaneously applying a downward force, portions of the clip nut may flex, and a misalignment can occur between the threads of the nut and the fastener that is being threaded into the nut. This misalignment can cause the fastener to bind, which can then cause a torque-sensitive tool to shut off before the fastener has been fully installed through the threads. Therefore, sometimes other types of fasteners (e.g., nut-plates) are preferentially used, which can lead to increased cost and/or weight.

SUMMARY

The present disclosure provides a spring fastener clip including a first strip with a first hole therethrough, a second strip including a second hole therethrough, and a third strip including a third hole therethrough. The clip is bent to form an S-shape wherein the first strip, the second strip, and the third strip are aligned one with another, and the first hole, the second hole, and the third hole are aligned one with another. The clip further includes a hook extending from the second strip to the first strip and including a tab proximate the first hole.

In some embodiments, the tab is situated within the first hole. In some embodiments, the hook includes an isthmus and the tab, the isthmus perpendicular to the second strip and extending from an edge of the second hole toward the first hole, the tab lying in the plane of the first strip. In some embodiments, the tab has a same thickness as the first strip. In some embodiments, the third hole has a non-circular shape sized to translationally hold a nut, and the third hole is concentrically aligned with the second hole. In some embodiments, the first strip further includes a spring bias cutout partially encompassing the first hole. In some embodiments, the clip further includes a slot cutout extending on either side of a first bend between the first strip and the second strip. In some embodiments, the second hole is larger than a fastener, wherein both the fastener and the isthmus fit within the second hole. In some such embodiments, the first strip includes a semicylindrical flange proximate the first hole, and the isthmus and the semicylindrical flange collectively define a restricted passageway that aligns the fastener with a nut translationally held in the third hole.

The present disclosure also provides a fastener assembly including a spring fastener clip. The spring fastener clip includes a first strip having a first hole therethrough to allow installation of a fastener, a second strip having a second hole therethrough to allow installation of the fastener, and a first bend situated between the first strip and the second strip and bringing the first strip and the second strip into alignment one with another. The first hole is aligned with the second hole to allow installation of the fastener. The second strip has a hook extending from the second strip to the first strip, and the hook includes a tab proximate the first hole.

In some embodiments, the tab is situated within the first hole. In some embodiments, the hook includes an isthmus and the tab, the isthmus perpendicular to the second strip and extending from an edge of the second hole to the first hole, the tab lying in the plane of the first strip. In some embodiments, the first strip includes a semicylindrical flange proximate the first hole. In some embodiments, the spring fastener clip further includes a third strip having a third hole therethrough, and a second bend situated between the second strip and the third strip and aligning the third strip with the second strip, and further aligning the third hole with the second hole. In some embodiments, the fastener assembly further includes a nut translationally held in the third hole. In some such embodiments, the fastener assembly further includes a fastener inserted within the first, second, and third holes, the fastener having a head portion proximate the first strip and the hook, and a shank portion extending through the second hole and having a threaded tip threaded through the nut translationally held in the third hole. In some such embodiments: the hook includes an isthmus and the tab, the isthmus perpendicular to the second strip and extending from an edge of the second hole to the first hole, the tab lying in the plane of the first strip; the first strip includes a semicylindrical flange proximate the first hole; and the isthmus and the semicylindrical flange collectively define a restricted passageway that aligns the fastener with the nut. In some embodiments, the fastener assembly further includes a substrate disposed between the first strip and the second strip, and an aircraft incorporating the substrate.

The present disclosure also provides a fastener assembly enabling coupling to a substrate, the fastener assembly including a spring fastener clip. The spring fastener clip includes a first strip including a first hole therethrough, a second strip including a second hole therethrough, and a third strip including a third hole therethrough. The clip is bent to form an S-shape wherein the first strip, the second strip, and the third strip are aligned one with another, and the first hole, the second hole, and the third hole are aligned one with another. The first strip and the second strip are situated on opposite sides of the substrate. The spring fastener clip further includes a hook having an isthmus and a tab, the isthmus perpendicular to the second strip and extending from an edge of the second hole through a fourth hole in the substrate to the first hole, the tab situated inside the first hole and in the plane of the first strip and hooking over an edge of the substrate from inside the fourth hole. The fastener assembly further includes a nut translationally held within the third hole, and a fastener traversing the first hole, the fourth hole, and the second hole, and threaded into the nut.

In some embodiments, the first strip includes a semicylindrical flange proximate the first hole, and the isthmus and the semicylindrical flange collectively define a restricted passageway that aligns the fastener with the nut.

Features, functions, and advantages may be achieved independently in various embodiments of the present disclosure, or may be combined in yet other embodiments, further details of which can be seen with reference to the following description and drawings.

DESCRIPTION

Overview

Various embodiments of a fastener assembly with a spring fastener clip are described below and illustrated in the associated drawings. Unless otherwise specified, a fastener assembly and/or spring fastener clip may, but are not required to, contain at least one of the structure, components, functionality, and/or variations described, illustrated, and/or incorporated herein. Furthermore, the structures, components, functionalities, and/or variations described, illustrated, and/or incorporated herein in connection with the present teachings may, but are not required to, be included in other fastener assemblies. The following description of various embodiments is merely exemplary in nature and is in no way intended to limit the disclosure, its application, or uses. Additionally, the advantages provided by the embodiments, as described below, are illustrative in nature and not all embodiments provide the same advantages or the same degree of advantages.

The examples described herein include a spring fastener clip that is flexible for easy installation on a substrate, but is secure and resists flexing once clipped in place on the substrate. The spring fastener clips described herein include at least first and second strips (e.g., metal strips), with a bend situated between the two strips to bring the strips into alignment one with another. Each strip includes a corresponding hole through the strip, and the holes are also aligned one with another. The hole in the second strip includes a hook that extends from the second strip to the first strip. The hook includes a tab proximate the first hole. When a substrate is disposed between the first and second strips, the tab can hook over an edge of the substrate through a hole in the substrate, and resist flexing of the clip on installation of a fastener. Some exemplary spring fastener clips also include a third strip separated from the second strip by a second bend, the third strip having a third hole aligned with the holes in the first and second strips.

An exemplary fastener assembly can include a spring fastener clip such as those described above, a nut translationally held in the third hole, and a fastener inserted within the first, second, and third holes and having a threaded tip threaded through the nut. The hook can include an isthmus and the tab, the isthmus perpendicular to the second strip and extending from an edge of the second hole to the first hole, the tab lying in the plane of the first strip. The first strip can include a semicylindrical flange proximate the first hole, where the isthmus and the semicylindrical flange collectively define a restricted passageway that aligns the fastener with the nut. This restricted passageway can reduce the possibility of misthreading during installation of a fastener into the assembly. Further, the hook can engage a substrate from within a hole in the substrate, providing resistance to a potential downward force from the fastener during installation. This downward force might otherwise deflect the second and/or third strips downward, also contributing to misthreading during the installation of the fastener. The semicylindrical flange and hook can also allow the fastener assembly to snap into the hole in the substrate without slipping.

A fastener assembly for coupling to a substrate can include a spring fastener clip having a first strip including a first hole therethrough, a second strip including a second hole therethrough, and a third strip including a third hole therethrough. The clip is bent to form an S-shape wherein the first strip, the second strip, and the third strip are aligned one with another, and the first hole, the second hole, and the third hole are aligned one with another. The first strip and the second strip are situated on opposite sides of the substrate. The spring fastener clip also includes means for preventing deflection of the second strip with respect to the first strip when the substrate is inserted between the first strip and the second strip. The means for preventing deflection can include, for example, a hook having an isthmus and a tab, the isthmus perpendicular to the second strip and extending from an edge of the second hole through a fourth hole in the substrate to the first hole, the tab situated inside the first hole and in the plane of the first strip and configured to hook over an edge of the substrate from inside the fourth hole.

Examples, Components, and Alternatives

The following sections describe selected aspects of exemplary spring fastener clips and fastener assemblies. The examples in these sections are intended for illustration and should not be interpreted as limiting the entire scope of the present disclosure. Each section may include one or more distinct inventions, and/or contextual or related information, function, and/or structure.

EXAMPLE 1

This example describes an illustrative fastener assembly including a spring fastener clip having first, second, and third aligned strips separated by two bends; see FIGS. 1-5.

In this example, spring fastener clip 100 is manufactured from a single sheet of metal, e.g., 0.012-inch spring steel or 0.020-inch steel. First strip 101 includes first hole 111; second strip 102 includes a second hole (not shown in FIG. 1), and third strip 103 includes a third hole in which a nut 200 is translationally held. A first bend 121 is situated between first strip 101 and second strip 102. A second bend 122 is situated between second strip 102 and third strip 103. A hook (131/132) extends from second strip 102 to first strip 101. The hook includes an isthmus 132 and a tab 131 proximate the first hole.

Figure 1:
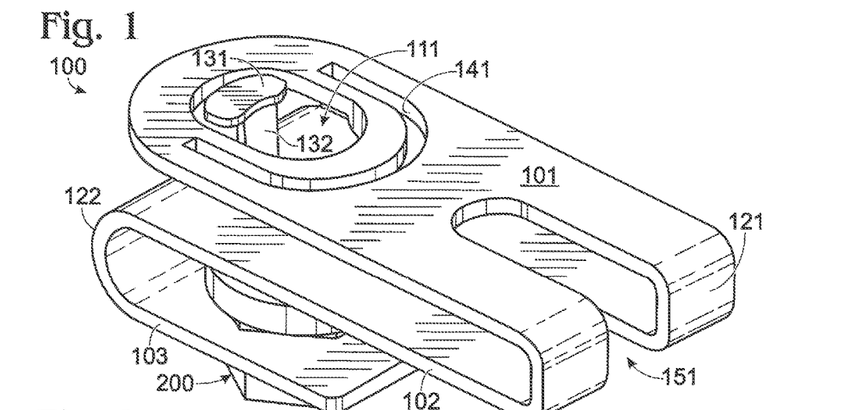
FIG. 1 illustrates an exemplary fastener assembly including a spring fastener clip with a first strip ("top") uppermost, and an associated nut.

In the illustrated example, the tab 131 is situated within first hole 111. However, in other embodiments the tab can be only partially situated within the first hole, or situated all or partially above or below the first hole. In the illustrated example, tab 131 is thinner than first strip 101, but in other embodiments the tab can be the same thickness as the first strip, or thicker than the first strip. In the illustrated example, tab 131 lies in the plane of first strip 101, but in other embodiments the tab is only partially in the plane of the first strip, or outside the plane of the first strip. The relative size and shape of tab 131 may also be different from those shown in the various drawings herein.

In the illustrated example, first strip 101 also includes an optional spring bias cutout 141 partially encompassing first hole 111. When a substrate (not shown in FIG. 1) is inserted between the first and second strips, or when the clip or fastener is moved to engage the substrate between the first and second strips, the spring bias cutout can provide a spring bias to push the tab into a hole in the substrate.

In the illustrated example, first strip 101 also includes an optional slot cutout 151 extending on either side of first bend 121. Slot cutout 151 is created by removing material, and therefore makes the resulting spring fastener clip 100 lighter. There may also be situations where it is helpful to see through slot cutout 151 to improve visibility when installing the spring fastener clip. Furthermore, in some situations, slot cutout 151 makes it easier to handle spring fastener clip 100.

Figure 2:
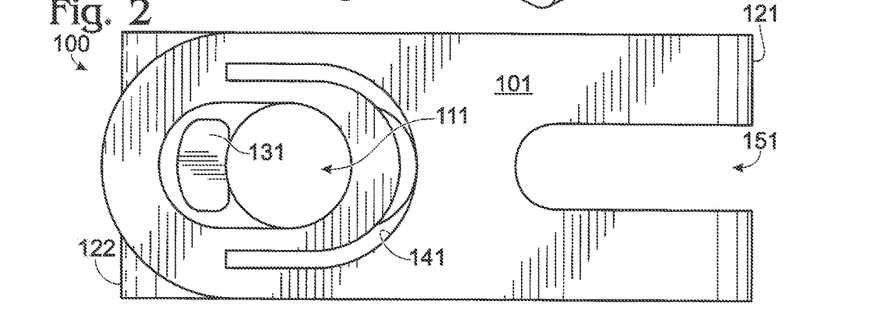
FIG. 2 is a top view of the spring fastener clip of FIG. 1.

FIG. 2 provides another view of spring fastener clip 100 of FIG. 1, as seen from the "top" side, i.e., the side including the first strip. (For clarity, the side of the first strip 101 is referred to herein as the "top" of the spring fastener clip or assembly; however, clearly any side of the clip can be the "top," depending on the orientation in which the clip or assembly is used.) For clarity, elements in FIG. 2 and the other drawings herein are identified using the same reference numerals as similar elements in FIG. 1. Elements with the same reference numerals may or may not be identical to other elements with the same reference numerals in other drawings.

Figure 3:
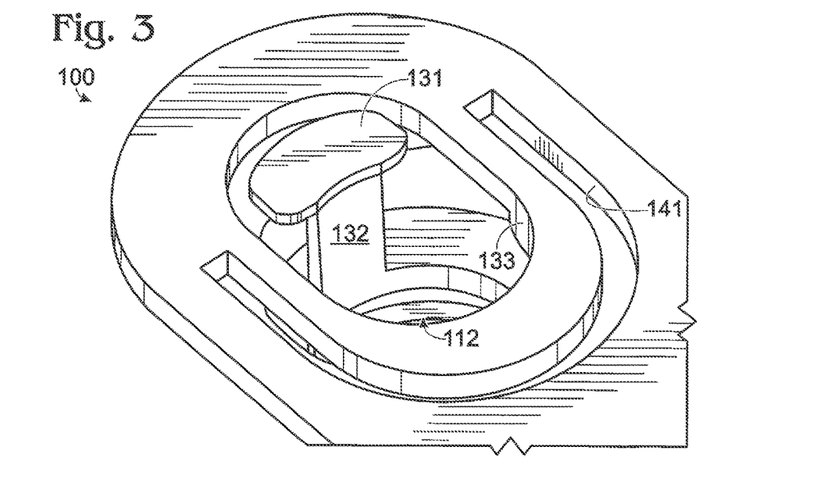
FIG. 3 is a close-up view of the spring fastener clip of FIG. 1.

FIG. 3 is a close-up view of the area of first hole 111 in spring fastener clip 100. In FIG. 3, second hole 112 of second strip 102 can be seen through first hole 111. In the illustrated embodiment, first strip 101 includes a semicylindrical flange 133 proximate first hole 111. Isthmus 132 and semicylindrical flange 133 collectively define a restricted passageway. When a fastener (e.g., a screw or bolt) is inserted in the fastener assembly, the isthmus and semicylindrical flange collectively define a restricted passageway that aligns the fastener with nut 200. Thus, the likelihood of misalignment between the nut and the fastener during installation is reduced. Semicylindrical flange 133 and hook 131/132 can also allow the fastener assembly to snap into a round hole in a substrate without slipping.

Figure 4:
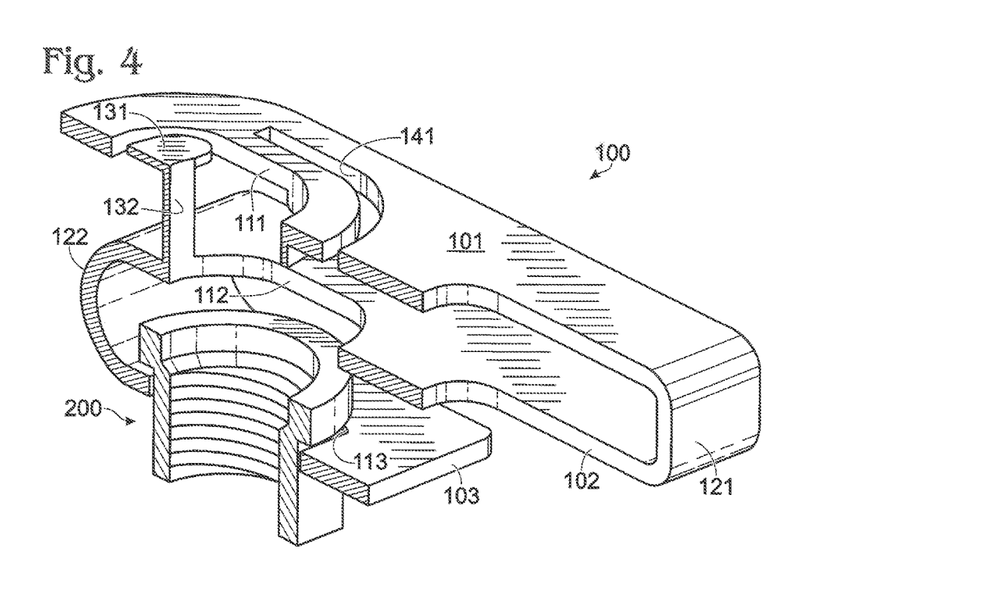
FIG. 4 is a cutaway view of the fastener assembly of FIG. 1.

FIG. 4 is a cutaway view of the fastener assembly of FIG. 1. In FIG. 4, first hole 111, second hole 112, and third hole 113 can clearly be seen. Third hole 113 is non-circular in shape, e.g., hexagonal, in order to translationally hold nut 200 when a fastener (not shown) is inserted into the assembly. Nut 200 can be threaded on the interior, to hold the fastener in place. As previously noted, in the illustrated example tab 131 is thinner than first strip 101, but in other embodiments the tab can be the same thickness as the first strip, or thicker than the first strip.

Figure 5:
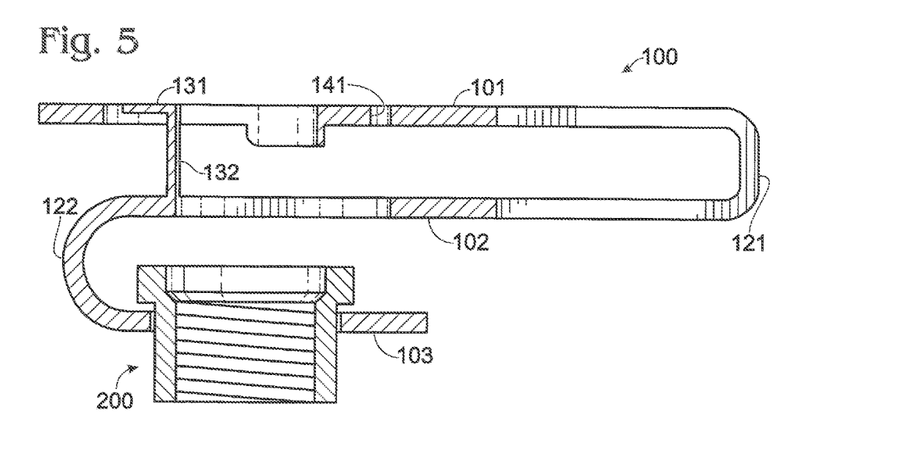
FIG. 5 is a side cutaway view of the fastener assembly of FIG. 1.

FIG. 5 provides another view of the fastener assembly of FIGS. 1 and 4, a cutaway view from the side. FIG. 5 illustrates an embodiment in which second bend 122 is implemented with a single radius, while first bend 121 is implemented with two separate radial bends. This configuration may be used to provide a given amount of vertical height for insertion of the substrate between first strip 101 and second strip 102. In other embodiments, the first and second bends are implemented in a different fashion, e.g., first bend 121 can have a single radius, or second bend 122 can have a double radius. FIG. 5 illustrates another embodiment in which the thickness of the metal used to form spring fastener 100 may not be uniform. In this example, the portion of the first strip 101 proximate first hole 111 and spring bias cutout 141 (e.g., the portion forming the semicylindrical flange) is thicker than the majority of the first strip. This increased thickness may add additional strength to this portion of the clip, and/or provide additional surface area to guide installation of a fastener in the clip.

EXAMPLE 2

Figure 6:
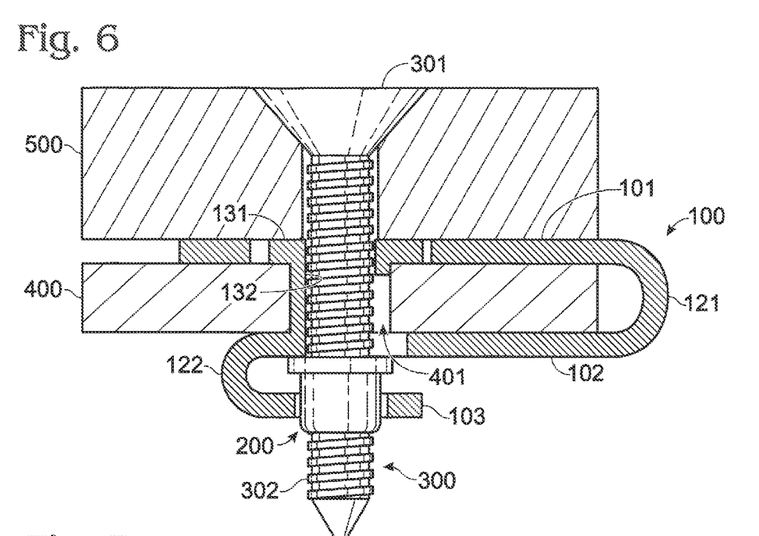
FIG. 6 is a side view of an exemplary fastener assembly that can include, for example, the spring fastener clip and nut of FIG. 1, an associated fastener, and a substrate.

This example illustrates how a fastener assembly including a spring fastener clip, a nut, and a fastener can be installed; see FIG. 6. The spring fastener clip can be, for example, similar to spring fastener clip 100 of FIGS. 1-5. A substrate 400 (e.g., a metal flange) is inserted between first strip 101 and second strip 102 of the clip. A hole 401 in the substrate is aligned with the holes in the first and second strips. In this example, another material 500 (e.g., a sheet of dashboard or some other material) to be attached to the substrate is placed in position adjacent first strip 101. A nut 200 is translationally held in a corresponding hole in the third strip 103.

A fastener 300 is inserted in the aligned holes in the clip and substrate and threaded through nut 200. As previously described, the first strip includes a semicylindrical flange proximate the first hole, and isthmus 132 and the semicylindrical flange collectively define a restricted passageway that aligns the fastener with the nut, reducing the likelihood of misalignment between the nut and the fastener during the installation. Hook 131/132 also engages substrate 400 from within hole 401, providing resistance to a potential downward force from fastener 300 during installation. This downward force might otherwise deflect second strip 102 and/or third strip 103 downward, also contributing to a misalignment between fastener 300 and nut 200. Semicylindrical flange 133 and hook 131/132 can also allow the fastener assembly to snap into hole 401 in substrate 400 without slipping.

The fastener illustrated in this example is a screw 300 having a head portion 301 proximate first strip 101 and the hook (131/132); and a shank portion 302 extending through the second hole and having a threaded tip threaded through nut 200 translationally held in the third hole.

Note that in this example first bend 121 has a single radius. In other embodiments, the first bend has two radii, as shown in FIGS. 1, 4, and 5 and as described in conjunction with FIG. 5.

EXAMPLE 3

This example provides additional views of the fastener assembly of FIGS. 1-5; see FIGS. 7-10.

Figure 7:
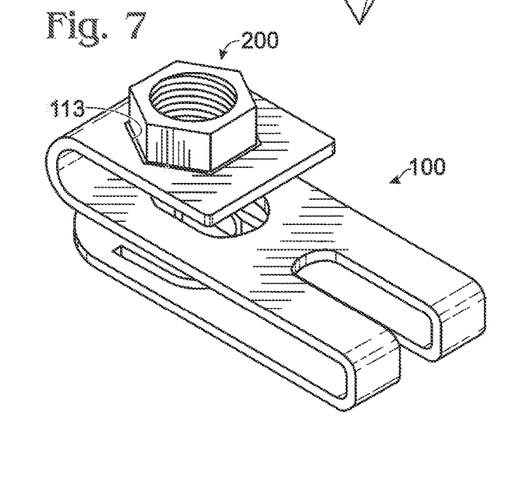
FIG. 7 illustrates the fastener assembly of FIG. 1 with a third strip ("bottom") of the clip uppermost.

FIG. 7 illustrates the fastener assembly of FIG. 1 with the third strip ("bottom") of the clip uppermost. (For clarity, the side of the third strip 103 is referred to herein as the "bottom" of the spring fastener clip or assembly; however, clearly any side of the clip can be the "bottom," depending on the orientation in which the clip or assembly is used.) In particular, third hole 113 is shown translationally holding nut 200. In this example, a hexagonal nut is used.

Figure 8:
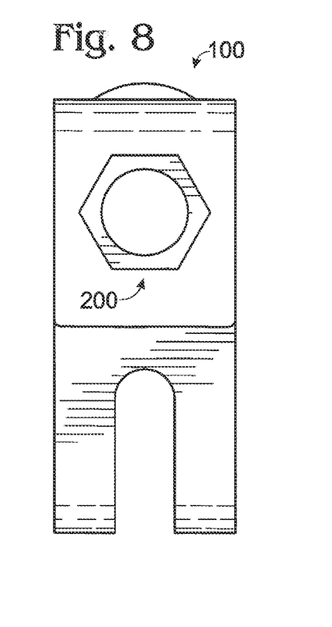
FIG. 8 is a bottom view of the fastener assembly of FIG. 7.

FIG. 8 is a bottom view of the fastener assembly of FIG. 7. Again, hexagonal nut 200 is clearly seen.

Figure 9:
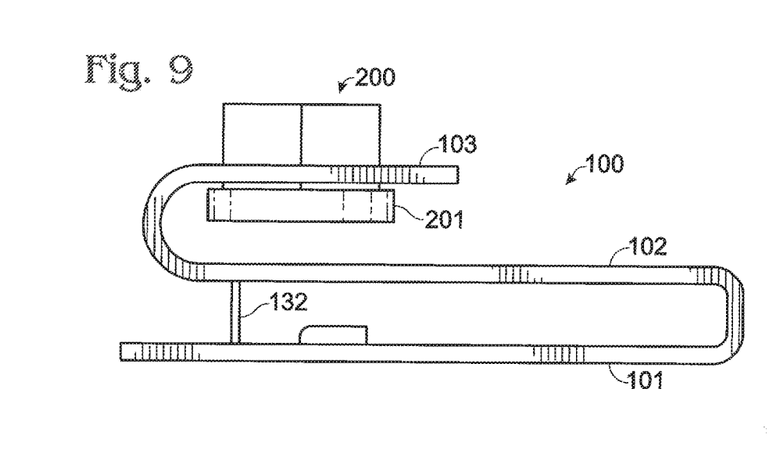
FIG. 9 is a side view of the fastener assembly of FIG. 7.

FIG. 9 is a side view of the fastener assembly of FIG. 7. Isthmus 132 and hexagonal nut 200 are shown. In the pictured example, nut 200 has a collar 201 that prevents nut 200 from slipping though third hole 113 in third strip 103. In other embodiments, other types of nuts can be used.

Figure 10:
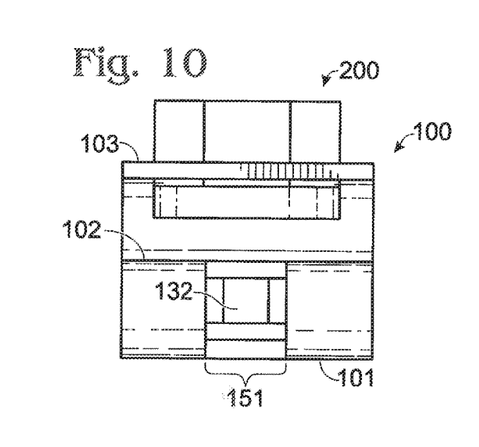
FIG. 10 is an end view of the fastener assembly of FIG. 7.

FIG. 10 is an end view of the fastener assembly of FIG. 7. Isthmus 132 is visible through slot cutout 151.

EXAMPLE 4

Figure 11:
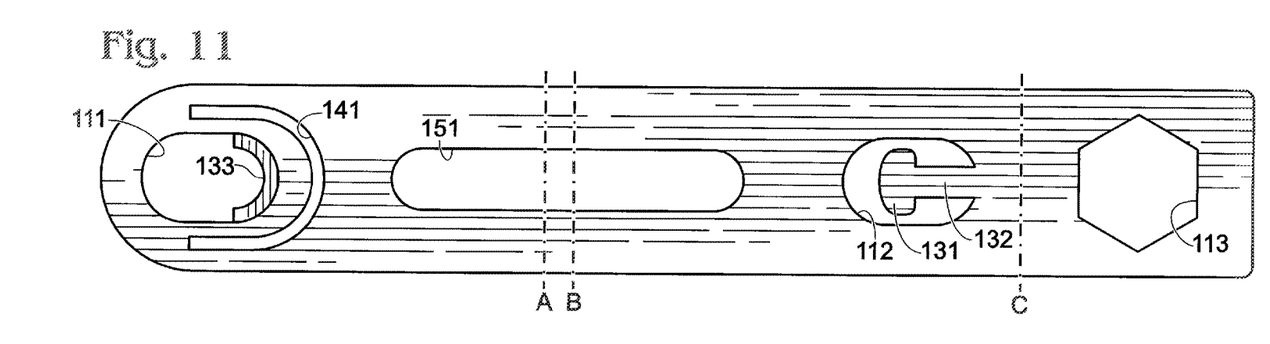
FIG. 11 illustrates an exemplary unitary sheet of metal that can be bent to produce the spring fastener clips of any of FIGS. 1-10.

This example illustrates an exemplary unitary sheet of metal that can be bent to produce the spring fastener clips of any of FIGS. 1-10; see FIG. 11. The spring fastener clip can have any appropriate dimensions. For example, in one embodiment the unitary sheet of metal illustrated in FIG. 11 is 2.5 inches long and 0.4 inches wide. However, these dimensions are purely exemplary, and will vary according to the application, the thickness of the substrate, the location of the installed clip, and so forth.

Three dotted lines in FIG. 11 indicate the centerlines of bends that can be made in the unitary sheet of metal to product the spring fastener clips of FIGS. 1-5 and 7-10. Note that the two bends in positions A and B will produce a bend 121 with two radii, to provide a given amount of vertical height for insertion of the substrate between the first and second strips. The bend in position C will produce second bend 122.

The unitary sheet of metal shown in FIG. 11 can be made of spring steel (e.g., 0.012-inch thickness), steel (e.g., 0.020-inch thickness), or some other material and/or thickness. The thickness may be uniform, or may vary throughout the sheet or at specific location(s) within the sheet, as shown in some of the examples illustrated herein.

EXAMPLE 5

This section describes additional aspects and features of spring fastener clips and fastener assemblies, presented without limitation as a series of paragraphs, some or all of which may be alphanumerically designated for clarity and efficiency. Each of these paragraphs can be combined with one or more other paragraphs, and/or with disclosure from elsewhere in this application, in any suitable manner. Some of the paragraphs below expressly refer to and further limit other paragraphs, providing without limitation examples of some of the suitable combinations.

A0. A spring fastener clip, comprising: a first strip including a first hole therethrough; a second strip including a second hole therethrough; a third strip including a third hole therethrough; wherein the clip is bent to form an S-shape wherein the first strip, the second strip, and the third strip are aligned one with another, and the first hole, the second hole, and the third hole are aligned one with another; and a hook extending from the second strip to the first strip and including a tab proximate the first hole.

A1. The spring fastener clip of paragraph A0, wherein the tab is situated within the first hole.

A2. The spring fastener clip of paragraph A0, wherein the hook comprises an isthmus and the tab, the isthmus perpendicular to the second strip and extending from an edge of the second hole toward the first hole, the tab lying in a plane with the first strip.

A3. The spring fastener clip of paragraph A0, wherein the tab has a same thickness as the first strip.

A4. The spring fastener clip of paragraph A0, wherein the third hole has a non-circular shape sized to translationally hold a nut, and the third hole is concentrically aligned with the second hole.

A5. The spring fastener clip of paragraph A0, wherein the first strip further includes a spring bias cutout partially encompassing the first hole.

A6. The spring fastener clip of paragraph A0, further comprising a slot cutout extending on either side of a first bend between the first strip and the second strip.

A7. The spring fastener clip of paragraph A2, wherein the second hole is larger than a fastener, wherein both the fastener and the isthmus fit within the second hole.

A8. The spring fastener clip of paragraph A7, wherein: the first strip includes a semicylindrical flange proximate the first hole; and the isthmus and the semicylindrical flange collectively define a restricted passageway that aligns the fastener with a nut translationally held in the third hole.

B0. A fastener assembly, comprising: a spring fastener clip including: a first strip having a first hole therethrough to allow installation of a fastener; a second strip having a second hole therethrough to allow installation of the fastener; and a first bend situated between the first strip and the second strip and bringing the first strip and the second strip into alignment one with another, wherein the first hole is aligned with the second hole to allow installation of the fastener; wherein the second strip has a hook extending from the second strip to the first strip, and the hook includes a tab proximate the first hole.

B1. The spring fastener clip of paragraph B0, wherein the tab is situated within the first hole.

B2. The fastener assembly of paragraph B0, wherein the hook comprises an isthmus and the tab, the isthmus perpendicular to the second strip and extending from an edge of the second hole to the first hole, the tab lying in a plane with the first strip.

B3. The fastener assembly of paragraph B2, wherein the first strip includes a semicylindrical flange proximate the first hole.

B4. The fastener assembly of paragraph B0, wherein the spring fastener clip further comprises: a third strip having a third hole therethrough; and a second bend situated between the second strip and the third strip and aligning the third strip with the second strip, and further aligning the third hole with the second hole.

B5. The fastener assembly of paragraph B4, further comprising a nut translationally held in the third hole.

B6. The fastener assembly of paragraph B5, further comprising a fastener inserted within the first, second, and third holes and having: a head portion proximate the first strip and the hook; and a shank portion extending through the second hole and having a threaded tip threaded through the nut translationally held in the third hole.

B7. The fastener assembly of paragraph B6, wherein: the hook comprises an isthmus and the tab, the isthmus perpendicular to the second strip and extending from an edge of the second hole to the first hole, the tab lying in a plane with the first strip; the first strip includes a semicylindrical flange proximate the first hole; and the isthmus and the semicylindrical flange collectively define a restricted passageway that aligns the fastener with the nut.

B8. The fastener assembly of paragraph B0, further comprising: a substrate disposed between the first strip and the second strip; and an aircraft incorporating the substrate.

C0. A fastener assembly enabling coupling to a substrate, comprising: a spring fastener clip including: a first strip including a first hole therethrough; a second strip including a second hole therethrough; a third strip including a third hole therethrough; wherein the clip is bent to form an S-shape wherein the first strip, the second strip, and the third strip are aligned one with another, and the first hole, the second hole, and the third hole are aligned one with another; wherein the first strip and the second strip are situated on opposite sides of the substrate; and a hook having an isthmus and a tab, the isthmus perpendicular to the second strip and extending from an edge of the second hole through a fourth hole in the substrate to the first hole, the tab situated inside the first hole and in a plane with the first strip and hooking over an edge of the substrate from inside the fourth hole; a nut translationally held within the third hole; and a fastener traversing the first hole, the fourth hole, and the second hole, and threaded into the nut.

C1. The fastener assembly of paragraph C0, wherein: the first strip includes a semicylindrical flange proximate the first hole; and the isthmus and the semicylindrical flange collectively define a restricted passageway that aligns the fastener with the nut.

Manner of Operation/Use

A method of utilizing a spring fastener clip or fastener assembly such as those described above can include sliding a spring fastener clip over an edge of a substrate, wherein the substrate is situated between a first strip and a second strip of the spring fastener clip, and aligning a hole in the substrate with a first hole in the first strip and a second hole in the second strip. A hook coupled to the second strip traverses the hole in the substrate and engages an edge of the substrate from inside the hole in the substrate.

The spring fastener clip can further include a third strip aligned with the second strip, the third strip including a third hole aligned with the second hole. A nut can be inserted into the third hole, where it is translationally held. For example, a hexagonal nut can be inserted into a hexagonal hole in the third strip. The nut can be held in place, if desired, by a loose cage that holds the nut, or the nut can be a cage nut, or some other type of nut can be used. A fastener is then inserted into the first hole, the hole in the substrate, and the second hole, and the fastener is threaded into the nut. The fastener may include a head portion proximate the first strip and the hook, and a shank portion extending through the second hole and having a threaded tip threaded through the nut. The shank portion of the fastener may be fully or partially threaded, as long as there is sufficient threading to cinch down the nut.

Advantages, Features, Benefits

The different embodiments of the spring fastener clips and fastener assemblies described herein provide several advantages over known solutions for attaching to a substrate. For example, the illustrative embodiments described herein resist flexing of the clip on installation of a fastener. Additionally, and among other benefits, the illustrative embodiments described herein reduce the possibility of misthreading and/or slippage during installation of a fastener. No known system or device can perform these functions, particularly in a blind installation situation. The illustrative embodiments described herein are particularly useful for aircraft or motor vehicle assembly, for example, but are not limited to such uses. However, not all embodiments described herein provide the same advantages or the same degree of advantage.

CONCLUSION

The disclosure set forth above may encompass multiple distinct inventions with independent utility. Although each of these inventions has been disclosed in its preferred form(s), the specific embodiments thereof as disclosed and illustrated herein are not to be considered in a limiting sense, because numerous variations are possible. To the extent that section headings are used within this disclosure, such headings are for organizational purposes only, and do not constitute a characterization of any claimed invention. The subject matter of the invention(s) includes all novel and nonobvious combinations and subcombinations of the various elements, features, functions, and/or properties disclosed herein. The following claims particularly point out certain combinations and subcombinations regarded as novel and nonobvious. Invention(s) embodied in other combinations and subcombinations of features, functions, elements, and/or properties may be claimed in applications claiming priority from this or a related application. Such claims, whether directed to a different invention or to the same invention, and whether broader, narrower, equal, or different in scope to the original claims, also are regarded as included within the subject matter of the invention(s) of the present disclosure.

I claim:

1. A spring fastener clip, comprising:
   a first strip including a first hole therethrough;
   a second strip including a second hole therethrough;
   a third strip including a third hole therethrough;
   wherein the clip is bent to form an S-shape wherein the first strip, the second strip, and the third strip are aligned one with another, and the first hole, the second hole, and the third hole are aligned one with another; and
   a hook extending from the second strip to the first strip and including a tab situated within the first hole.

2. The spring fastener clip of claim 1, wherein the hook comprises an isthmus and the tab, the isthmus perpendicular to the second strip and extending from an edge of the second hole toward the first hole, the tab lying in a plane with the first strip.

3. The spring fastener clip of claim 2, wherein the second hole is larger than a fastener, wherein both the fastener and the isthmus fit within the second hole.

4. The spring fastener clip of claim 3, wherein:
   the first strip includes a semicylindrical flange proximate the first hole; and
   the isthmus and the semicylindrical flange collectively define a restricted passageway that aligns the fastener with a nut translationally held in the third hole.

5. The spring fastener clip of claim 1, wherein the tab has a same thickness as the first strip.

6. The spring fastener clip of claim 1, wherein the third hole has a non-circular shape sized to translationally hold a nut, and the third hole is concentrically aligned with the second hole.

7. The spring fastener clip of claim 1, wherein the first strip further includes a spring bias cutout partially encompassing the first hole.

8. The spring fastener clip of claim 1, further comprising a slot cutout extending on either side of a first bend between the first strip and the second strip.

9. A fastener assembly, comprising:
   a spring fastener clip including:
   a first strip having a first hole therethrough to allow installation of a fastener;
   a second strip having a second hole therethrough to allow installation of the fastener; and
   a first bend situated between the first strip and the second strip and bringing the first strip and the second strip into alignment one with another, wherein the first hole is aligned with the second hole to allow installation of the fastener;
   wherein the second strip has a hook extending from the second strip to the first strip, and the hook includes a tab situated within the first hole.

10. The fastener assembly of claim 9, wherein the hook comprises an isthmus and the tab, the isthmus perpendicular to the second strip and extending from an edge of the second hole to the first hole, the tab lying in a plane with the first strip.

11. The fastener assembly of claim 10, wherein the first strip includes a semicylindrical flange proximate the first hole.

12. The fastener assembly of claim 9, wherein the spring fastener clip further comprises:
   a third strip having a third hole therethrough; and
   a second bend situated between the second strip and the third strip and aligning the third strip with the second strip, and further aligning the third hole with the second hole.

13. The fastener assembly of claim 12, further comprising a nut translationally held in the third hole.

14. The fastener assembly of claim 13, further comprising a fastener inserted within the first, second, and third holes and having:
   a head portion proximate the first strip and the hook; and
   a shank portion extending through the second hole and having a threaded tip threaded through the nut translationally held in the third hole.

15. The fastener assembly of claim 14, wherein:
   the hook comprises an isthmus and the tab, the isthmus perpendicular to the second strip and extending from an edge of the second hole to the first hole, the tab lying in a plane with the first strip;
   the first strip includes a semicylindrical flange proximate the first hole; and
   the isthmus and the semicylindrical flange collectively define a restricted passageway that aligns the fastener with the nut.

16. The fastener assembly of claim 9, further comprising:
   a substrate disposed between the first strip and the second strip; and
   an aircraft incorporating the substrate.

17. A fastener assembly enabling coupling to a substrate, comprising:
   a spring fastener clip including:
      a first strip including a first hole therethrough;
      a second strip including a second hole therethrough;
      a third strip including a third hole therethrough;
   wherein the clip is bent to form an S-shape wherein the first strip, the second strip, and the third strip are aligned one with another, and the first hole, the second hole, and the third hole are aligned one with another;
   wherein the first strip and the second strip are situated on opposite sides of the substrate; and
   a hook having an isthmus and a tab, the isthmus perpendicular to the second strip and extending from an edge of the second hole through a fourth hole in the substrate to the first hole, the tab situated inside the first hole and in a plane with the first strip and hooking over an edge of the substrate from inside the fourth hole;
   a nut translationally held within the third hole; and
   a fastener traversing the first hole, the fourth hole, and the second hole, and threaded into the nut.

18. The fastener assembly of claim 17, wherein:
   the first strip includes a semicylindrical flange proximate the first hole; and
   the isthmus and the semicylindrical flange collectively define a restricted passageway that aligns the fastener with the nut.

* * * * *